(12) United States Patent
Thompson et al.

(10) Patent No.: US 12,344,720 B2
(45) Date of Patent: Jul. 1, 2025

(54) POLYURETHANE ACRYLATE PROTECTIVE DISPLAY FILM (71) Applicant: 3M INNOVATIVE PROPERTIES COMPANY, St. Paul, MN (US)

(72) Inventors: David Scott Thompson, Bayport, MN (US); Steven D. Solomonson, Shoreview, MN (US); Karissa Lynn Eckert, Ham Lake, MN (US); John James Stradinger, Roseville, MN (US); Catherine A. Leatherdale, Woodbury, MN (US); Peter D. Condo, Lake Elmo, MN (US); Richard J. Pokorny, Maplewood, MN (US); Ryan M. Braun, St. Paul, MN (US); Michael A. Johnson, Stillwater, MN (US); Joseph D. Rule, Woodbury, MN (US); Kevin R. Schaffer, Woodbury, MN (US); Derek W. Patzman, Savage, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 487 days.

(21) Appl. No.: 16/307,572

(22) PCT Filed: Jun. 6, 2017

(86) PCT No.: PCT/US2017/036098
§ 371 (c)(1),
(2) Date: Dec. 6, 2018

(87) PCT Pub. No.: WO2017/214105
PCT Pub. Date: Dec. 14, 2017

(65) Prior Publication Data
US 2019/0211168 A1    Jul. 11, 2019

Related U.S. Application Data (60) Provisional application No. 62/347,939, filed on Jun. 9, 2016.

(51) Int. Cl.
*C08J 7/048* (2020.01)
*B32B 7/06* (2019.01)
(Continued)

(52) U.S. Cl.
CPC ............... *C08J 7/048* (2020.01); *B32B 7/06* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS

| 4,745,152 A | 5/1988 | Fock |
| 4,921,759 A | 5/1990 | Orain |

(Continued)

FOREIGN PATENT DOCUMENTS

| JP | 2007-254705 | 10/2007 |
| JP | 2012-91406 | 5/2012 |

(Continued)

OTHER PUBLICATIONS

Machine translation of WO2011-158839. (Year: 2011).*

(Continued)

*Primary Examiner* — Scott R. Walshon
*Assistant Examiner* — Thomas A Mangohig
(74) *Attorney, Agent, or Firm* — Clifton F. Richardson; Erik M. Drange; Lisa P. Fulton (57) ABSTRACT

A display film includes a transparent cross-linked polyurethane acrylate layer. The transparent cross-linked polyure- (Continued)

thane acrylate layer having a glass transition temperature of 10 degrees Celsius or less and a Tan Delta peak value of 0.5 or greater.

17 Claims, 1 Drawing Sheet

(51) Int. Cl.
| | |
|---|---|
| B32B 7/12 | (2006.01) |
| B32B 27/08 | (2006.01) |
| B32B 27/30 | (2006.01) |
| B32B 27/40 | (2006.01) |
| C08F 290/06 | (2006.01) |
| C08G 18/67 | (2006.01) |
| C08J 3/24 | (2006.01) |
| C08J 5/12 | (2006.01) |
| C08J 5/18 | (2006.01) |
| C08J 7/04 | (2020.01) |
| C08J 7/043 | (2020.01) |
| C08J 7/046 | (2020.01) |
| C09D 1/00 | (2006.01) |
| C09D 7/40 | (2018.01) |
| C09D 135/02 | (2006.01) |
| C09D 151/08 | (2006.01) |
| C09D 175/16 | (2006.01) |
| G02B 1/14 | (2015.01) |

(52) U.S. Cl.
CPC .......... *B32B 27/308* (2013.01); *B32B 27/40* (2013.01); *C08F 290/067* (2013.01); *C08G 18/672* (2013.01); *C08J 3/24* (2013.01); *C08J 5/124* (2013.01); *C08J 5/18* (2013.01); *C08J 7/0427* (2020.01); *C08J 7/043* (2020.01); *C08J 7/046* (2020.01); *C09D 1/00* (2013.01); *C09D 7/66* (2018.01); *C09D 7/67* (2018.01); *C09D 135/02* (2013.01); *C09D 151/08* (2013.01); *C09D 175/16* (2013.01); *G02B 1/14* (2015.01); *B32B 2250/03* (2013.01); *B32B 2250/04* (2013.01); *B32B 2255/10* (2013.01); *B32B 2255/26* (2013.01); *B32B 2264/102* (2013.01); *B32B 2305/72* (2013.01); *B32B 2307/412* (2013.01); *B32B 2307/51* (2013.01); *B32B 2307/584* (2013.01); *B32B 2307/732* (2013.01); *B32B 2457/20* (2013.01); *C08J 2375/14* (2013.01); *C08J 2435/02* (2013.01)

(56) References Cited

U.S. PATENT DOCUMENTS

| | | | |
|---|---|---|---|
| 5,277,944 A | 1/1994 | Holzer | |
| 5,798,409 A | 8/1998 | Ho | |
| 6,376,082 B1 | 4/2002 | Edmond | |
| 6,376,590 B2 | 4/2002 | Kolb | |
| 6,524,712 B1* | 2/2003 | Schledjewski | B32B 27/08 |
| | | | 428/423.1 |
| 6,607,831 B2* | 8/2003 | Ho | B32B 27/40 |
| | | | 427/393.5 |
| 7,178,264 B2 | 2/2007 | Kim | |
| 7,241,437 B2 | 7/2007 | Davidson | |
| 7,980,910 B2 | 7/2011 | Padiyath | |
| 8,263,731 B2 | 9/2012 | Liu | |
| 8,507,632 B2 | 8/2013 | Hara | |
| 8,551,279 B2 | 10/2013 | Johnson | |
| 9,290,666 B2 | 3/2016 | Takihara | |
| 9,346,986 B2 | 5/2016 | Kim | |
| 2006/0148950 A1 | 7/2006 | Davidson | |
| 2008/0020170 A1 | 1/2008 | Haubrich | |
| 2008/0188583 A1* | 8/2008 | Attenburrow | C08G 18/348 |
| | | | 522/1 |
| 2009/0004478 A1* | 1/2009 | Baetzold | C09D 175/16 |
| | | | 428/412 |
| 2009/0280329 A1 | 11/2009 | Rukavina | |
| 2011/0045306 A1 | 2/2011 | Johnson | |
| 2012/0204566 A1 | 8/2012 | Hartzell | |
| 2012/0229893 A1 | 9/2012 | Hebrink | |
| 2013/0251961 A1 | 9/2013 | Johnson | |
| 2013/0261209 A1 | 10/2013 | Kim | |
| 2014/0092360 A1 | 4/2014 | Zheng | |
| 2015/0207102 A1 | 7/2015 | Jeong | |
| 2015/0330597 A2 | 11/2015 | Schaffer | |
| 2016/0016338 A1 | 1/2016 | Radcliffe | |

FOREIGN PATENT DOCUMENTS

| | | | | |
|---|---|---|---|---|
| WO | WO 2003-094256 | 11/2003 | | |
| WO | WO 2006-102383 | 9/2006 | | |
| WO | WO 2009-005970 | 1/2009 | | |
| WO | WO 2009-029438 | 3/2009 | | |
| WO | WO 2009-120548 | 10/2009 | | |
| WO | WO 2011-056396 | 5/2011 | | |
| WO | WO2011/158839 | * 12/2011 | ............ | B05D 3/067 |
| WO | WO 2014-011731 | 1/2014 | | |
| WO | WO 2014-045782 | 3/2014 | | |
| WO | WO2014/092422 | * 6/2014 | ............ | B05D 3/067 |
| WO | WO 2014-197194 | 12/2014 | | |
| WO | WO 2014-197368 | 12/2014 | | |
| WO | WO 2016-196460 | 12/2014 | | |
| WO | WO 2017-105908 | 6/2017 | | |

OTHER PUBLICATIONS

Machine translation of WO 2011/158839 A1 (Year: 2011).*
Miller, "A New Derivation of Post Gel Properties of Network Polymers", Mar. 1976, Macromolecules, vol. 9, No. 2, pp. 206-211.
Ni "A review on colorless and optically transparent polyimide films: Chemistry, process and engineering applications", Aug. 2015, Journal of Industrial and Engineering Chemistry, vol. 28, pp. 16-27.
International Search report for PCT International Application No. PCT/US2017/036098 mailed on Sep. 1, 2018, 3 pages.

* cited by examiner

POLYURETHANE ACRYLATE PROTECTIVE DISPLAY FILM

BACKGROUND

Displays and electronic devices have evolved to be curved, bent, or folded and provide new user experiences. These device architectures may include flexible organic light emitting diodes (OLEDs), plastic liquid crystal displays (LCDs) and the like, for example.

In order to realize such flexible displays and protect elements in the displays, a flexible cover sheet or flexible window film replaces a conventional glass cover sheet. This flexible cover sheet has a number of design parameters such as; high visible light transmission, low haze, excellent scratch resistance and puncture resistance, in order to protect the elements included in the display devices. In some cases the flexible cover sheet may also need to withstand thousands of folding events around a tight bend radius (about 5 mm or less) without showing visible damage. In other cases, the flexible cover sheet must be able to unfold without leaving a crease after being bent at elevated temperature and humidity.

A variety of hard coated plastic substrates have been explored. More exotic materials like hard coated colorless transparent polyimide films have also been shown to have high hardness and good scratch resistance. However many hard coated films fail to withstand folding events around a tight bend radius without showing visible damage.

SUMMARY

The present disclosure relates to display film that protects a display window and may survive flexing or folding tests. The protective display film maintains optical properties of a display film while providing scratch resistance to the display. The display film includes a transparent cross-linked polyurethane acrylate layer.

In one aspect, a display film includes a transparent cross-linked polyurethane acrylate layer. The transparent cross-linked polyurethane acrylate layer having a glass transition temperature of 10 degrees Celsius or less and a Tan Delta peak value of 0.5 or greater.

In another aspect, a display film includes a transparent polymeric substrate layer, and a transparent cross-linked polyurethane acrylate layer disposed on the transparent polymeric substrate layer. The transparent cross-linked polyurethane acrylate layer has a glass transition temperature of 10 degrees Celsius or less and a Tan Delta peak value of 0.5 or greater.

In another aspect, a display film includes a transparent cross-linked polyurethane acrylate layer, and a transparent protective layer disposed on the transparent cross-linked polyurethane acrylate layer. The transparent cross-linked polyurethane acrylate layer having a glass transition temperature of 10 degrees Celsius or less and a Tan Delta peak value of 0.5 or greater. The transparent protective layer may be a hardcoat layer, an abrasion resistant layer or an elastic nano-composite layer.

In another aspect, an article includes an optical display, a display film described herein, and an optical adhesive layer fixing the display film to the optical display.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The terms "display film", "protective film", "cover sheet film", and "protective display film" are herein used interchangeably.

"Transparent substrate" or "transparent layer" refers to a substrate or layer that has a high light transmission (typically greater than 90%) over at least a portion of the surface of the substrate over at least a portion of the light spectrum with wavelengths of about 350 to about 1600 nanometers, including the visible light spectrum (wavelengths of about 380 to about 750 nanometers).

"Polyurethane acrylate" refers to a polymer that includes primarily urethane and acrylate moieties or segments.

The phrase "glass transition temperature" refers herein to the "on-set" glass transition temperature by DSC and is measured according to ASTM E1256-08 2014.

The phrase "Tan Delta peak value" and peak temperature is measured according to the DMA analysis described in the Examples.

The present disclosure relates to display film that protects a display or display window and may survive flexing or folding tests. The protective display film maintains optical properties of a display film while providing scratch resistance or abrasion resistance to the display. The protective display film includes a core layer of a cross-linked polyurethane acrylate material that is transparent. The protective display film may protect flexible optical displays even under conditions of dynamic folding at low temperatures. The cross-linked polyurethane acrylate has a low glass transition temperature, such as 10 degrees Celsius less, or zero degrees Celsius or less, or −10 degrees Celsius or less, or −20 degrees Celsius or less. The cross-linked polyurethane acrylate has a Tan Delta peak value of 0.5 or greater, or 0.8 or greater, or 1.0 or greater, or 1.2 or greater. The protective display film can include a layered structure including a layer of the cross-linked polyurethane acrylate material and hardcoat layer or hardcoated substrate layer disposed on the cross-linked polyurethane acrylate layer, for example. These protective display film may withstand a bend radius of 5 mm or less, or 4 mm or less, or 3 mm or less, or 2 mm or less, or even 1 mm or less without failure or visible defects, such as delamination, cracking, or haze. While the present disclosure is not so limited, an appreciation of various aspects of the disclosure will be gained through a discussion of the examples provided below.

Figure 1:
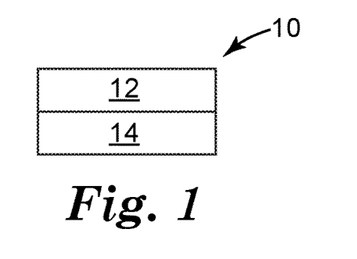
FIG. 1 is a schematic diagram side elevation view of an illustrative display film.

FIG. 1 is a schematic diagram side elevation view of an illustrative display film 10. The terms "display film", "cover film", "protective film", "protective cover film" or "protective display film" are used interchangeable herein. The display film 10 includes a transparent polymeric substrate layer 12 and a transparent cross-linked polyurethane acrylate layer 14 disposed on the transparent polymeric substrate layer 12. The transparent cross-linked polyurethane acrylate layer 14 has a glass transition temperature of 10 degrees Celsius or less and a Tan Delta peak value of 0.5 or greater.

Figure 2:
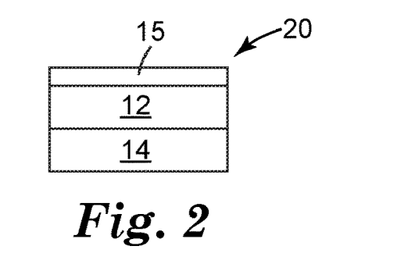
FIG. 2 is a schematic diagram side elevation view of another illustrative display film.

FIG. 2 is a schematic diagram side elevation view of an illustrative display film 20 that includes a hardcoat layer 15. The hardcoat layer 15 is disposed on the transparent polymeric substrate layer 12, and the transparent polymeric substrate layer 12 separates the transparent cross-linked polyurethane acrylate layer 14 from the hardcoat layer 15.

Figure 3:
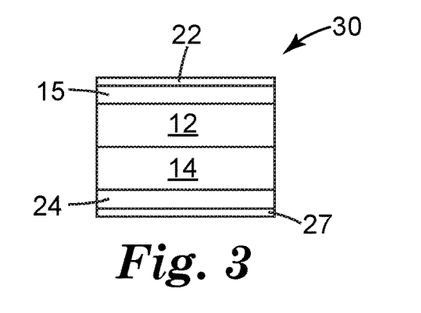
FIG. 3 is a schematic diagram side elevation view of another illustrative display film.

FIG. 3 is a schematic diagram side elevation view of an illustrative display film 30 that includes the construction of FIG. 2 with an optional adhesive layer 24 and release liners 22, 27 defining the outer surfaces of the illustrative display film 30. The adhesive layer 24 is disposed on the transparent cross-linked polyurethane acrylate layer 14. The transparent cross-linked polyurethane acrylate layer 14 separates the transparent polymeric substrate layer 12 from the adhesive layer 24.

The adhesive layer 24 may be an optical adhesive. The adhesive layer 24 may be a pressure sensitive adhesive. The adhesive layer 24 may be included in any of the display film constructions described herein. One or both of the release liners 22, 27 may be included in any of the display film constructions described herein. The release liners may also be referred to as "premask" layers that may be easily removed for application to an optical display or to reveal the display film, before or after placement onto an optical display. The optical adhesive layer may include acrylate or silicone based optical adhesives.

The removable liners (or premask layers) 22, 27 may provide transport protection to the underlying display film 12, 14, 15 and optional optical adhesive layer 24. The removable liners 22, 27 may be layer or film that has a low surface energy to allow clean removal of the liner 22, 27 from the display film 10 and optional optical adhesive layer 24. The removable liners 22, 27 may be a layer of polyester coated with a silicone, for example.

The removable liner 27 may provide temporary structure to the optional optical adhesive layer 24. For example, WO2014/197194 and WO2014/197368 describe removable liners that emboss an optical adhesive layer where the optical adhesive losses its structures once the removable liner is stripped away from the optical adhesive layer.

Figure 4:
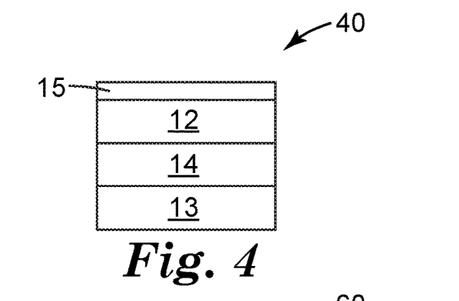
FIG. 4 is a schematic diagram side elevation view of another illustrative display film.

FIG. 4 is a schematic diagram side elevation view of another illustrative display film 40 that includes the construction of FIG. 2 with a second transparent substrate layer 13. The second transparent polymeric substrate layer 13 is disposed on the transparent cross-linked polyurethane acrylate layer 14. The transparent cross-linked polyurethane acrylate layer 14 separates the transparent polymeric substrate layer 12 from the second transparent polymeric substrate layer 13.

Figure 5:
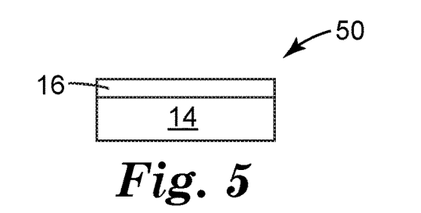
FIG. 5 is a schematic diagram side elevation view of another illustrative display film.

FIG. 5 is a schematic diagram side elevation view of another illustrative display film 50. A transparent protective layer 16 is disposed on a transparent cross-linked polyurethane acrylate layer 14. The transparent cross-linked polyurethane acrylate layer 14 has a glass transition temperature of 10 degrees Celsius or less and a Tan Delta peak value of 0.5 or greater. The protective layer 16 may be a hardcoat layer, or an abrasion resistant layer, or an elastic nanocomposite layer.

Figure 6:
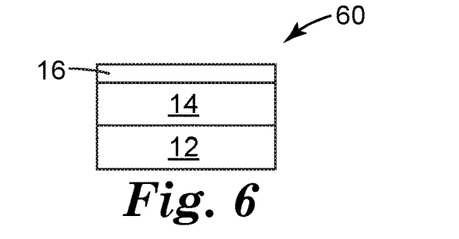
FIG. 6 is a schematic diagram side elevation view of another illustrative display film.

FIG. 6 is a schematic diagram side elevation view of another illustrative display film 60 that includes the construction of FIG. 5 with a transparent substrate layer 12 disposed on the transparent cross-linked polyurethane acrylate layer 14. The transparent cross-linked polyurethane acrylate layer 14 separates the transparent substrate layer 12 from the transparent protective layer 16.

The illustrative display film constructions may include an ink border that defines a viewing window. The ink border may be a continuous frame element printed, for example, onto the transparent cross-linked polyurethane acrylate layer or the substrate layer, for example.

Figures 7, 8:
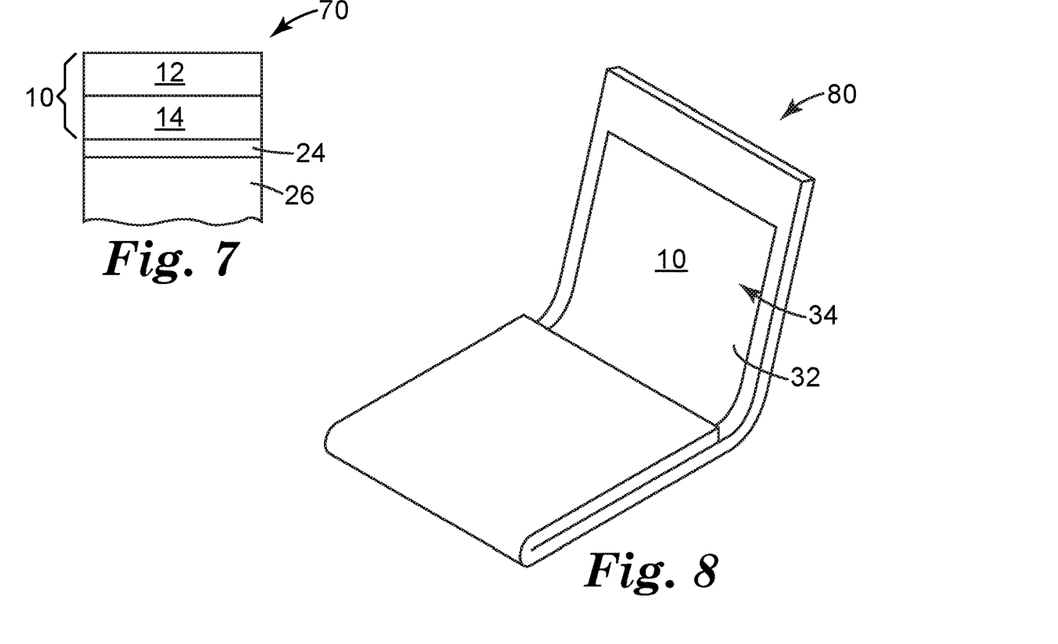
FIG. 7 is a schematic diagram side elevation view of an illustrative display film on an optical display forming an article.
FIG. 8 is a schematic diagram perspective view of an illustrative folding article including an illustrative display film.

FIG. 7 is a schematic diagram side elevation view of an illustrative display film 10 on an optical element 26 forming an article 70. The display film 10 may be any of the of display film constructions described herein. An adhesive layer 24 (such as an optical adhesive) adheres the display film 10 to the optical element 26. In some cases the optical adhesive permanently fixes the display film to the optical element 26. In other cases the display film and optical adhesive can be removed/debonded/repositioned, relative to the optical element 26, with the application of heat or mechanical force such that the display film is replaceable or repositionable by the consumer.

Further examples of optical displays include static display such as commercial graphic signs and billboards.

FIG. 8 is a schematic diagram perspective view of an illustrative folding display device 80 including an illustrative display film 10. The display film 10 may be any of the display film constructions described herein disposed on an optical element such as an optical display 34. The display device may not be a folding article and may only flex within a certain range, or may be a static curved display device.

An optical display 34 may form at least a portion of display device. The display device 80 may include a display window 32. The display device 80 can be any useful article such as a phone or smartphone, electronic tablet, electronic notebook, computer, and the like. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in US 2015/0330597.

The display film 10 and the optical display 34 may be foldable so that the optical display 34 faces itself and at least a portion of display film 10 contacts or directly faces another portion of the protective film 10, as illustrated in FIG. 8. The display film 10 and the optical display 34 may be flexible or bendable or foldable so that a portion of the display film 10 and the optical display 34 can articulate relative to another portion of the display film 10 and the optical display 34. The display film 10 and the optical display 34 may be flexible or bendable or foldable so that a portion of the display film 10 and the optical display 34 can articulate at least 90 degrees or at least 170 degrees relative to another portion of the display film 10 and the optical display 34.

The display film 10 and the optical display 34 may be flexible or bendable or foldable so that a portion of the display film 10 and the optical display 34 can articulate relative to another portion of the display film 10 and optical display 34 to form a bend radius of 3 mm or less in the display film 10 at the bend or fold line. The display film 10 and the optical display 34 may be flexible or bendable or foldable so that a portion of the display film 10 and optical display 34 can articulate relative to another portion of the display film 10 and the optical display 34 to form a bend radius such that the display film 10 overlaps itself and is separated from each other by a distance on 10 mm or less, or 6 mm or less or 3 mm or less or contacts each other.

The protective cover films described herein may be constructed in a number of ways, but include a core inner layer (cross-linked polyurethane acrylate layer) that provides beneficial properties in impact while not leading to failure in dynamic folding events, even at low temperatures (such as less than 10 degrees Celsius, or less than 0 degrees Celsius, or less than-10 degrees Celsius, or less than-20 degrees Celsius).

The transparent cross-linked polyurethane acrylate layer (or core layer) may be designed to have beneficial properties with respect to impact resistance and the ability to survive dynamic folding at low temperature conditions. In some embodiments, the cross-linked polyurethane acrylate layer (or core layer) includes chemically crosslinked materials derived from free radical polymerization of multifunctional urethane acrylate oligomers. In some embodiments, the urethane acrylate oligomer is mixed with other low molecular weight multifunctional acrylates to modify the pre-cured viscosity of the resin for the purposes of processing. Generally the average functionality of the multifunctional acrylate used in the core layer prior to cure is less than 3 (i.e. 3 functional acrylate functional groups per molecule) or can be 2 or less. The ideal cured material exhibits stable material properties with respect to the display film use in application, that is, the core inner layer does not exhibit appreciable flow.

In some embodiments, it is desirable for the glass transition temperature of the cross-linked polyurethane acrylate layer (or core layer) to be 10 degrees Celsius or less, or 0 degrees Celsius or less, or −10 degrees Celsius or less, or −20 degrees Celsius or less, or −25 degrees Celsius or less. In some cases, it is also desirable that the crosslinked material have a high Tan Delta (>0.5, >0.8, >1.0 or greater than 1.2).

In some embodiments, the cross-linked polyurethane acrylate layer may be formed of a plurality of layers, each layer being a cross-linked polyurethane acrylate material and at least two of these layers having a different glass transition temperature value. These layers may have a different glass transition temperature value by at least 2 degrees Celsius, or at least 5 degrees Celsius, or at least 10 degrees Celsius, for example. In some cases, the crosslinked polyurethane acrylate peak Tan Delta values may occur at different frequencies at a specified temperature.

The transparent cross-linked polyurethane acrylate layer has a thickness of at least 50 micrometers or at least 75 micrometers. The transparent cross-linked polyurethane acrylate layer has a thickness in a range from 75 to 200 micrometers, or 100 to 200 micrometers, or from 150 to 200 micrometers. The thickness of the transparent cross-linked polyurethane acrylate layer is a balance between being thick enough to provide the desired protection to the display and thin enough to provide the dynamic parameters and reduced thickness design parameters.

The hardcoat layer has a thickness of less than 50 micrometers or less than 40 micrometers. The hardcoat layer has a thickness in a range from 2 to 30 micrometers, or from 2 to 15 micrometers, or from 3 to 10 micrometers. The hardcoat layer includes nanoparticles.

Suitable hardcoats can include a variety of cured polymeric materials having inorganic nanoparticles. These hardcoats can include but are not limited to (meth)acrylic based hardcoats, siloxane hardcoats, polyurethane hardcoats and the like.

One preferable class of hardcoats include acrylic hardcoats comprising inorganic nanoparticles. Such hardcoats can have a polymerizable resin composition comprising mixtures of multifunctional (meth)acrylic monomers, oligomers, and polymers, where the individual resins can be monofunctional, difunctional, trifunctional, tetrafunctional or have even higher functionality.

In preferred cases, the polymerizable (meth)acrylate components of the resin system are chosen such that when polymerized the hardcoat contains little to no free (meth) acrylic monomers.

Useful multifunctional (meth)acrylate monomers and oligomers include:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri (meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl) isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl monomers such as, for example, urethane acrylates, polyester acrylates, and epoxy acrylates can also be employed.

Such (meth)acrylate monomers are widely available from vendors such as, for example, Sartomer Company of Exton, Pennsylvania; Cytec Industries of Woodland Park, N; and Aldrich Chemical Company of Milwaukee, Wisconsin.

In some embodiments, the hardcoat composition comprises at least one (e.g. solely) a crosslinking agent (meth) acrylate monomer comprising at least three (meth)acrylate functional groups. In some embodiments, the crosslinking monomer comprises at least four, five or six (meth)acrylate functional groups. Acrylate functional groups tend to be favored over (meth)acrylate functional groups.

Preferred commercially available crosslinking agent include for example trimethylolpropane triacrylate (commercially available from Sartomer Company, Exton, PA under the trade designation "SR351"), ethoxylated trimethylolpropane triacrylate (commercially available from Sartomer Company, Exton, PA under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxy ethyl) isocyanurate triacrylate (from Sartomer under the trade designation "SR368". In some embodiments, the second (e.g. crosslinking) monomer does not comprise C2-C4 alkoxy repeat units.

The hardcoat composition may include surface modified inorganic oxide particles that add mechanical strength and durability to the resultant coating. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat.

The size of inorganic oxide particles is chosen to avoid significant visible light scattering.

The hard coat composition may comprises a significant amount of surface modified inorganic oxide nanoparticles having an average (e.g. unassociated) primary particle size or associated particle size of at least 10, 20, 30, 40 or 50 nm and no greater than about 200, 175 or 150 nm. When the hardcoat composition lacks a significant amount of inorganic nanoparticles of such size, the cured hardcoat can crack when subjected to the pencil hardness test described herein. The total concentration of inorganic oxide nanoparticles is typically a least 30, 35, or 40 wt-% solids and generally no greater than 90 wt-%, 80 wt-%, or 75 wt-% and in some embodiments no greater than 70 wt-%, or 65 wt-%, or 60 wt-% solids.

The hardcoat composition may comprise up to about 10 wt-% solids of smaller nanoparticles. Such inorganic oxide nanoparticles typically having an average (e.g. unassociated) primary particle size or associated particle size of at least 1 nm or 5 nm and no greater than 50, 40, or 30 nm.

The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, or a core of an oxide of one type (or a core of a material other than a metal oxide) on which is deposited an oxide of another type. Silica is a common inorganic particle utilized in hardcoat compositions. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid).

Aqueous colloidal silicas dispersions are commercially available from Nalco Chemical Co., Naperville, IL under the trade designation "Nalco Collodial Silicas" such as products 1040, 1042, 1050, 1060, 2327, 2329, and 2329K or Nissan Chemical America Corporation, Houston, TX under the trade name Snowtex™. Organic dispersions of colloidal silicas are commercially available from Nissan Chemical under the trade name Organosilicasol™. Suitable fumed silicas include for example, products commercially available from Evonki DeGussa Corp., (Parsippany, NJ) under the trade designation, "Aerosil series OX-50", as well as product numbers –130, –150, and –200. Fumed silicas are also commercially available from Cabot Corp., Tuscola, IL, under the trade designations CAB—O-SPERSE 2095", "CAB—O-SPERSE A105", and "CAB-O-SIL M5".

It may be desirable to employ a mixture of inorganic oxide particle types to optimize an optical property, material property, or to lower that total composition cost.

As an alternative to or in combination with silica the hardcoat may comprise various high refractive index inorganic nanoparticles. Such nanoparticles have a refractive index of at least 1.60, 1.65, 1.70, 1.75, 1.80, 1.85, 1.90, 1.95, 2.00 or higher. High refractive index inorganic nanoparticles include for example zirconia ("$ZrO_2$"), titania ("$TiO_2$"), antimony oxides, alumina, tin oxides, alone or in combination. Mixed metal oxide may also be employed.

Zirconias for use in the high refractive index layer are available from Nalco Chemical Co. under the trade designation "Nalco OOSS008", Buhler AG Uzwil, Switzerland under the trade designation "Buhler zirconia Z—WO sol" and Nissan Chemical America Corporation under the trade name NanoUse ZR™. Zirconia nanoparticles can also be prepared such as described in U.S. Patent Publication No. 2006/0148950 and U.S. Pat. No. 6,376,590. A nanoparticle dispersion that comprises a mixture of tin oxide and zirconia covered by antimony oxide (RI-1.9) is commercially available from Nissan Chemical America Corporation under the trade designation "HX-05M5". A tin oxide nanoparticle dispersion (RI-2.0) is commercially available from Nissan Chemicals Corp. under the trade designation "CX-S401M". Zirconia nanoparticles can also be prepared such as described in U.S. Pat. Nos. 7,241,437 and 6,376,590.

The inorganic nanoparticles of the hardcoat are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of their surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliccous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependent upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

The silane surface treatments comprise one or more alkoxy silane groups when added to the inorganic oxide (e.g. silica) dispersions. The alkoxy silane group(s) hydrolyze with water (present in the nanoparticle dispersion) to form Si—OH, (hydroxy groups). These SiOH groups then react with SiOH groups on the nano-silica surface to form silane surface treated nano-silica.

In some embodiments, the inorganic oxide (e.g. silica) nanoparticles are separately surface modified with a (e.g. copolymerizable or non-polymerizable) silane surface treatment and the hardcoat comprises a mixture of both types of surface modified inorganic oxide (e.g. silica) nanoparticles. In other embodiments, the inorganic oxide (e.g. silica) nanoparticles are concurrently surface modified with both a copolymerizable and a non-polymerizable silane surface treatment.

The inorganic oxide (e.g. silica) nanoparticles comprise at least one copolymerizable silane surface treatment. The copolymerizable silane surface treatment comprises a free-radically polymerizable group, such as a meth (acryl) or vinyl. The free-radically polymerizable group copolymerizes with the free-radically polymerizable (e.g. (meth)acrylate) monomers of the hardcoat composition.

Suitable (meth)acryl organosilanes include for example (meth)acryloy alkoxy silanes such as 3-(methacryloyloxy) propyltrimethoxysilane, 3-acryloylxypropyltrimethoxysilane, 3-(methacryloyloxy) propylmethyldimethoxysilane, 3-(acryloyloxypropyl)methyl dimethoxysilane, 3-(methacryloyloxy) propyldimethylmethoxysilane, and 3-(acryloyloxypropyl)dimethylmethoxysilane. In some embodiments, the (meth)acryl organosilanes can be favored over the acryl silanes. Suitable vinyl silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy) silane and the like.

Suitable non polymerizable surface treatments include methyltrimethoxysilane, methyltriethoxysilane, propyltriethoxysilane, isopropyltriethoxysilane, isooctyltriethoxysilane, phenyltriemethoxy silane, cyanopropyltrimethoxysilane, and the like.

To facilitate curing of the hardcoat, polymerizable compositions described herein may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Useful free-radical photoinitiators include, for example, those known as useful in the UV cure of acrylate polymers such as described in WO2006/102383.

The hardcoat composition may optionally comprise various additives. For example, silicone or fluorinated additive may be added to lower the surface energy of the hardcoat. In one embodiment, the hardcoat coating composition further comprises at least 0.005 and preferably at least 0.01 wt-% solids of one or more perfluoropolyether urethane additives, such as described in U.S. Pat. No. 7,178,264. The total amount of perfluoropolyether urethane additives alone or in combination with other fluorinated additives typically ranges from to 0.05% to 1 wt-% solids.

The perfluoropolyether urethane material is preferably prepared from an isocyanate reactive HFPO- material. Unless otherwise noted, "HFPO-" refers to the end group $F(CF(CF_3)CF_2O)_aCF(CF_3)$- of the methyl ester $F(CF(CF_3)CF_2O)_aCF(CF_3)C(O)OCH_3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. For example, in one embodiment, "a" averages 6.2. The molecular weight of the HFPO-perfluoropolyether material varies depending on the number ("a") of repeat units from about 940 g/mole to about 1600 g/mole, with 1 100 g/mole to 1400 g/mole typically being preferred.

Certain silicone additives have also been found to provide ink repellency in combination with low lint attraction, as described in WO 2009/029438; incorporated herein by reference. Such silicone (meth)acrylate additives generally comprise a polydimethylsiloxane (PDMS) backbone and at least one alkoxy side chain terminating with a (meth) acrylate group. The alkoxy side chain may optionally comprise at least one hydroxyl substituent. Such silicone (meth)

acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction.

The transparent polymeric substrate layer has a thickness greater than 10 micrometers or less than 200 micrometers. The transparent polymeric substrate layer has a thickness in a range from 10 to 125 micrometers, or from 25 to 100 micrometers, or from 30 to 85 micrometers. The transparent polymeric substrate layer may have a yield stress value greater than 70 MPa, or greater than 90 MPa, or greater than 120 MPa, or greater than 160 MPa. The phrase "yield stress" or "offset yield stress" refers herein to "0.2% offset yield strength" as defined in ASTM D638-14. ASTM D638-14 section A2.6 defines the test method for "offset yield strength" and is defined as the stress at which the strain exceeds by a specified amount (the offset) an extension of the initial proportional portion of the stress-strain curve. It is expressed in force per unit area, usually megapascals (pounds force per square inch).

The transparent polymeric substrate layer may be formed of any useful polymeric material that provides the desired mechanical properties (such as dimensional stability) and optical properties (such as light transmission and clarity) to the display film. Examples of materials suitable for use in the polymeric substrate layer include polymethylmethacrylate, polycarbonate, polyamides, polyimide, polyesters (PET, PEN), polycyclic olefin polymers, and thermoplastic polyurethanes.

One useful polymeric material for forming the transparent polymeric substrate layer is polyimide. In many embodiments the polyimide substrate layer is colorless. Colorless polyimide can be formed via chemistry or via nanoparticle incorporation. Some exemplary colorless polyimides formed via chemistry are described in WO 2014/092422.

The transparent polymeric substrate layer may be primed or treated to impart some desired property to one or more of its surfaces. In particular the transparent polymeric substrate layer can be primed to improve adhesion of the transparent polyurethane acrylate material with the transparent polymeric substrate layer. Examples of such treatments include corona, flame, plasma and chemical treatments such as, acrylate or silane treatments.

The transparent polyurethane acrylate material may be coated onto the transparent polymeric substrate layer (that may be primed) and then be cured or cross-linked to form a thermoset or cross-linked polyurethane acrylate layer. The polyurethane acrylates described herein are thermosetting polymers that do not melt when heated.

When the transparent protective layer is an abrasion resistant layer, this layer may have a thickness in a range from 2 to 100 micrometers, or from 2 to 50 micrometers, or from 4 to 25 micrometers, or from 4 to 12 micrometers. In many cases, the abrasion resistant layer comprises a hardcoat layer, as described above. The hardcoat may comprise any chemistry that provides suitable abrasion resistance properties. Examples of suitable chemistries include but are not limited to acrylic hardcoats, polyurethane hardcoats, siloxane hardcoats, ene-thiol based hardcoats and the like. In many cases the abrasion resistant layer comprises inorganic nanoparticles which may be surface functionalized for compatibility and or reactivity.

Abrasion is a method of wearing down or rubbing away material by means of friction. The abrasion resistance of a material helps it to withstand mechanical action and tends to protect the removal of materials from its surface. This allows the material to retain its integrity and hold its form. Abrasion resistance can be measured by rubbing or wiping the transparent protective layer for a specified number of cycles with a rough material such as steel wool or a scouring pad and then inspecting the layer for visible changes such as fine scratches or haze.

When the transparent protective layer is an elastic nanocomposite layer, this layer has a thickness in a range from 30 to 125 micrometers. This elastic nanocomposite material can be made from any useful material that provides durable surface properties to the outer layer. In some cases, this elastic nanocomposite layer is made from polyurethane nanocomposite materials such as silica nanoparticle filled UV curable polyurethane resins for example multifunction polyurethane (meth)acrylate resins (as described herein). In other embodiments the elastic nanocomposite material can be made from nanoparticle filled ionic elastomer materials. This elastic nano-composite layer is capable of stretching within an elastic range, so that permeant deformation does not occur. The proportional limit for a material is defined as the maximum stress at which the stress is proportional to strain (Hooke's law). The elastic limit is the minimum stress at which permanent deformation can be measured. The elastic nano-composite layer may have a strain at the elastic limit that is 20% greater than the strain at the proportional limit, 50% greater than the strain at the proportional limit, or 100% greater than the strain at the proportional limit. The graph on page 8 of U.S. Pat. Appl. Pub. No. 2019/0211168 (Thompson et al.) illustrates this concept.

The overall thickness of the display film described herein may have any useful value depending on the application. The thickness of the display film is a balance between being thick enough to provide the desired display protection and thin enough to provide the folding and reduced thickness design parameters. When the display film folds upon itself, then this film may have a total thickness in a range from 85 to 350 micrometers or from 100 to 300 micrometers or from 150 to 250 micrometers. When the display film moderately flexes, then this film may have total thickness in a range from 300 to 500 micrometers. When the display film is curved but does not appreciably flex, then this film may have total thickness in a range from 500 to 1000 micrometers.

The display film can includes one or more additional layers. These optional layers may include a transparent barrier layer (thickness from 3 to 200 nanometers), a microstructure layer, an anti-glare layer, anti-reflective layer, or an anti-fingerprint layer.

The hardcoat layer 15 may be disposed on either side of one or both of the transparent polymeric substrate layer 12 or the transparent aliphatic cross-linked polyurethane layer 14. The hardcoat layer may include a multi-functional acrylate resin with at least 30% wt nanosilica particles. WO2014/011731 describes some exemplary hardcoats.

The transparent barrier layer may be disposed on either side of one or both of the transparent polymeric substrate layer 12 and the transparent aliphatic cross-linked polyurethane layer 14. The transparent barrier layer can mitigate or slow ingress of oxygen or water through the display film. Transparent barrier layers may include for example, thin alternating layers of silica, alumina or zirconia together with an organic resin. Exemplary transparent barrier layer are described in U.S. Pat. No. 7,980,910 and WO2003/094256.

In one embodiment, the display film includes a transparent polymeric substrate layer (having a thickness in a range from 35 to 75 micrometers) and a transparent cross-linked polyurethane acrylate layer (having a thickness in a range from 100 to 200 micrometers) disposed on the transparent polymeric substrate layer. A hardcoat layer (having a thickness is a range from 4 to 10 micrometers) is disposed on the transparent polymeric substrate layer. The transparent cross-linked polyurethane acrylate layer has a glass transition temperature of less than 0 degrees Celsius, and a Tan Delta peak value greater than 1.0. The display film has a haze value of 1% or less.

The display film may have a haze value of 2% or less, or 1.5% or less, or 1% or less, or 0.5% or less. In some embodiments the display film 10 may have a haze value of 5% or less. The display film may have a clarity of 98% or greater, or 99% or greater. The display film may have a visible light transmission of 85% or greater, or 90% or greater, or 93% or greater.

The display film may have a yellow index or b* value of 5 or less, or 4 or less, or 3 or less, or 2 or less, or 1 or less. In many embodiments the display film may have a yellow index or b* value of 1 or less.

The display film may maintain a haze value of 2% or less, or 1.5% or less, or 1% or less after at least 10,000, 25,000, 50,000 or 100,000 bending or folding cycles about a 3 mm radius. The display film may maintain a stable haze value, or remain intact without cracking or delaminating, after at least 10,000, 25,000, 50,000 or 100,000 bending or folding cycles about a 5 mm radius, or about a 4 mm radius, or about a 3 mm radius, or about a 2 mm radius, or about a 1 mm radius. The display film may remain intact after at least 10,000, 25,000, 50,000 or 100,000 bending or folding cycles about a 3 mm radius or less.

Objects and advantages of this disclosure are further illustrated by the following examples, but the particular materials and amounts thereof recited in these examples, as well as other conditions and details, should not be construed to unduly limit this disclosure.

EXAMPLES

All parts, percentages, ratios, etc. in the examples are by weight, unless noted otherwise. Solvents and other reagents used were obtained from'Sigma-Aldrich Corp., St. Louis, Missouri unless specified differently.

A series of cross-linked polyurethane acrylate materials were prepared on a 50 micrometer layer of low melt PEN (LmPEN) transparent film. For some examples, the LmPEN film was coated with a UV curable, silica filled acrylate hardcoat layer. In other examples, the polyurethane acrylate reactive material was coated directly on corona treated LmPEN using a specified liner. Each construction was characterized using the test methods described below.

TABLE 1

| Materials | |
|---|---|
| Abbreviation or Trade Designation | Description |
| CN9004 | Aliphatic polyurethane acrylate oligomer, commercially available from Sartomer Arkema Group, Exton, PA. |
| CN3211 | Aliphatic polyester polyurethane acrylate oligomer, commercially available from Sartomer Arkema Group, Exton, PA. |
| CD9043 | Alkoxylated neopentyl glycol diacrylate, commercially available from Sartomer Arkema Group, Exton, PA. |
| SR399 | Dipentaerythritol penta acrylate, commercially available from the Sartomer Arkema Group, Exton, PA |
| SR601 | Ethoxylated (4) bisphenol A diacrylate, commercially available from the Sartomer Arkema Group, Exton, PA. |
| SR501 | Propoxylated trimethylolpropane triacrylate, commercially available from Sartomer Arkema Group, Exton, PA. |
| SR531 | Cyclic trimethylol formal acrylate, commercially available from the Sartomer Arkema Group, Exton, PA. |
| SR415 | Ethoxylated trimethylolpropane triacrylate, commercially available from the Sartomer Arkema Group, Exton, PA. |
| SR444c | Pentaerythritol triacrylate and pentaerythritol tetraacrylate mixture, commercially available from the Sartomer Arkema Group, Exton, PA |
| SR9035 | Ethoxylated (15) Trimethylolpropane Triacrylate, commercially available from the Sartomer Arkema Group, Exton, PA. |
| SR344 | Polyethylene glycol 400 diacrylate, commercially available from the Sartomer Arkema Group, Exton, PA. |
| Irgacure TPO-L | Liquid photinitiator, BASF |
| Irgacure 184 | Photoinitiator, BASF |
| LmPEN Film | Low melt polyethylene napthalate polymer (co-polyester made from 90% NDC (dimethyl-2,6-naphthalenedicarboxylate) and 10% terephthalic acid, extruded and biaxially oriented by 3M. |
| ZF-50 | Cyclo-olefin copolymer available from Zeon Corp. |
| PM-1501 | Wood protector, commercially available from 3M, St. Paul, MN |

Preparation of Primed LmPEN Film

A primer solution was made by mixing 52.5 grams of Vitel 2200B (Bostik Americas, Wauwatosa, WI) in 2447.5 grams of methyl ethyl ketone (Fisher scientific) to make a homogeneous solution. The primer solution was applied to 37.5 micrometer and 50 micrometer LmPEN films in a roll to roll process where the primer solution was metered through a slot die onto the moving web. Thickness was controlled by the use of a metering pump and a mass flow meter. The volatile components of the coating were then dried in a 3 zone air floatation zone oven (ovens temperatures set all set to 175° F.). The dried coating was then wound into a roll and the primer coating had a thickness of approximately 81 nm.

Preparation of High Index Hardcoat Solution

To a 1 gallon jar was added 1440.7 grams of 10 nm surface functionalized zirconia nanoparticles (as described in U.S. Pat. No. 7,241,437) in 1-methoxy-2-propanol (at 59.0% by weight). To the solution was added 65.00 grams of SR399, 65 grams of SR601, 409.3 grams of methylethylketone and 20.0 grams of Irgacure 184. The solution was stirred for 30 minutes to produce a solution at 50% solids by weight.

Preparation of ¼ wavelength Primed LmPEN Film

A primer solution was made by mixing 23.2 grams of High Index Hardcoat Solution and 3.6 grams of WB50 sulphonated polyester resin (3M) in 155.5 grams of methyl ethyl ketone (Fisher scientific) and 467.7 grams of Cyclohexanone to make a homogeneous solution. The primer solution was applied to 37.5 micrometer, 50 micrometer and 69 micrometer LmPEN films in a roll to roll process where the primer solution was metered through a slot die onto the moving web. Thickness was controlled by the use of a metering pump and a mass flow meter. The volatile components of the coating were then dried in a 3 zone air floatation zoned oven (ovens temperatures set all set to 175° F.). The dried coating was then wound into a roll and the primer coating had a thickness of approximately 100 nm.

Preparation of Hardcoated Film 1

A hardcoat solution was made by mixing 37.79 grams of Esacure 1 (Lamberti, Gallarate, Italy), 2729.62 grams of A174 functionalized 20 nm silica particles (45% by weight in 1-methoxy-2-propanol), 909.87 grams of methyltrimethoxysilane functionalized 20 nm silica particles (45% by weight in 1-methoxy-2-propanol), 259.25 grams of SR399, 348.99 grams of SR9035, 478.62 grams of SR444c, 42.88 grams of SR344 in 1430.98 grams of methyl ethyl ketone (Fisher scientific). The solution was stirred until all components were dissolved. To the solution was added 11.99 g of PM-1501 (3M) and the solution was stirred for another 20 minutes. The resulting solution was essentially homogeneous with a clear bluish appearance. The hardcoat solution was applied to primed films on LmPEN and film in a roll to roll process where the solution was metered through a slot die onto the moving web. Thickness was controlled by the use of a metering pump and a mass flow meter. The volatile components of the coating were then dried in a 3 zone air floatation zone oven (ovens temperatures set all set to 175° F.). The dried coating was then cured with an in-line 600 W/in Fusion UV curing station with a dichroic reflector, H bulb, nitrogen inerting, and chilled backup roll. The cured coating was then wound into a roll.

Example 1: Polyurethane Acrylate Resin and film

Into a Flacktek Inc. size 20 speedmixer cup was added 69.65 g of CN9004 and 29.85 g of CD9043. The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of TPO-L catalyst (BASF). The contents were again mixed at 3100 rpm for 1 min. The resulting solution was then placed into a vacuum oven at 40 Celsius and was degassed to remove all dissolved air and bubbles from the viscous solution. The solution had a viscosity of ~34000 cP at room temperature. Film samples were made from this resin by coating the resin between a 2 mil thick cyclo-olefin copolymer ZF-50 (Zeon Corp.) and a 2 mil thick T50 silicone release coated polyester liner. The solution between films was drawn under a notch bar such a 175 µm film was cast. The coating between liners was irradiated under low power 350 nm black light bulbs for 15 minutes to give a cured film with elastic properties.

Example 2: Polyurethane Acrylate Resin and Film

Into a Flacktek Inc. size 20 speedmixer cup was added 79.60 g of CN9004 and 19.90 g of SR501. The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of Irgacure TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~80000 cP at room temperature. Film samples were made from this resin by coating the resin between a 2 mil thick ZF-50 and a 2 mil thick T50 silicone release coated polyester liner. The solution between films was drawn under a notch bar such a 175 µm film was cast. The coating between liners was irradiated under low power 350 nm black light bulbs for 15 minutes to give a cured film with elastic properties.

Example 3: Polyurethane Acrylate Resin and Film

Into a Flacktek Inc. size 20 speedmixer cup was added 99.5 g of CN9004 and 0.5 g of Irgacure TPO-L catalyst. The contents were mixed using a Flacktek DAC 150 FVZ—K speedmixer and were mixed at 3100 rpm for 1 min. The resulting solution was homogeneous near colorless viscous solution. The resulting solution was then placed into a vacuum oven at 40 Celsius and was degassed to remove all dissolved air and bubbles from the viscous solution. The solution had a viscosity of ~50000 cP at room temperature. Film samples were made from this resin by coating the resin between a 2 mil thick ZF-50 and a 2 mil thick T50 silicone release coated polyester liner. The solution between films was drawn under a notch bar such a 175 µm film was cast. The coating between liners was irradiated under low power 350 nm black light bulbs for 15 minutes to give a cured film with elastic properties.

Example 4: Polyurethane Acrylate Resin and Film

Into a Flacktek Inc. size 20 speedmixer cup was added 99.5 g of CN3211 and 0.5 g of Irgacure TPO-L catalyst. The contents were mixed using a Flacktek DAC 150 FVZ—K speedmixer and were mixed at 3100 rpm for 1 min. The resulting solution was homogeneous near colorless viscous solution. The resulting solution was then placed into a vacuum oven at 40 Celsius and was degassed to remove all dissolved air and bubbles from the viscous solution. The solution had a viscosity of ~25000 cP at room temperature. Film samples were made from this resin by coating the resin between a 2 mil thick ZF-50 and a 2 mil thick T50 silicone release coated polyester liner. The solution between films was drawn under a notch bar such a 175 µm film was cast. The coating between liners was irradiated under low power 350 nm black light bulbs for 15 minutes to give a cured film with elastic properties.

Example 5: Polyurethane Acrylate Resin (90/10) and Film

Into a Flacktek Inc. size 20 speedmixer cup was added 79.60 g of CN3211 (Sartomer, Inc.) and 19.90 g of SR501 (Sartomer, Inc.). The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of Irgacure TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~8500 cP at room temperature. Film samples were made from this resin by coating the resin between a 2 mil thick ZF-50 and a 2 mil thick T50 silicone release coated polyester liner. The solution between films was drawn under a notch bar such a 175 µm film was cast. The coating between liners was irradiated under low power 350 nm black light bulbs for 15 minutes to give a cured film with elastic properties.

Example 6: Polyurethane Acrylate Resin (80/20) and Film

Into a Flacktek Inc. size 20 speedmixer cup was added 79.60 g of CN3211 and 19.90 g of CD9043. The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~5800 cP at room temperature. Film samples were made from this resin by coating the resin between a 2 mil thick ZF-50 and a 2 mil thick T50 silicone release coated polyester liner. The solution between films was drawn under a notch bar such a 175 μm film was cast. The coating between liners was irradiated under low power 350 nm black light bulbs for 15 minutes to give a cured film with elastic properties.

Example 7: Polyurethane Acrylate Resin (80/20) and Film

Into a Flacktek Inc. size 20 speedmixer cup was added 79.60 g of CN3211 and 19.90 g of SR415. The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~5500 cP at room temperature. Film samples were made from this resin by coating the resin between a 2 mil thick ZF-50 and a 2 mil thick T50 silicone release coated polyester liner. The solution between films was drawn under a notch bar such a 175 μm film was cast. The coating between liners was irradiated under low power 350 nm black light bulbs for 15 minutes to give a cured film with elastic properties.

Example 8: Polyurethane Acrylate Resin (70/30) and Film

Into a Flacktek Inc. size 20 speedmixer cup was added 69.65 g of CN3211 and 29.85 g of SR531. The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of Irgacure TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~4000 cP at room temperature. Film samples were made from this resin by coating the resin between a 2 mil thick ZF-50 and a 2 mil thick T50 silicone release coated polyester liner. The solution between films was drawn under a notch bar such a 175 μm film was cast. The coating between liners was irradiated under low power 350 nm black light bulbs for 15 minutes to give a cured film with elastic properties.

Example 9: Polyurethane Acrylate Resin (80/20) and Film

Into a Flacktek Inc. size 20 speedmixer cup was added 79.60 g of CN3211 and 19.90 g of SR531. The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of Irgacure TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~5000 cP at room temperature. Film samples were made from this resin by coating the resin between a 2 mil thick ZF-50 and a 2 mil thick T50 silicone release coated polyester liner. The solution between films was drawn under a notch bar such a 175 μm film was cast. The coating between liners was irradiated under low power 350 nm black light bulbs for 15 minutes to give a cured film with elastic properties.

Example 10: Polyurethane Acrylate Resin (90/10) and Film

Into a Flacktek Inc. size 20 speedmixer cup was added 89.55 g of CN3211 (Sartomer, Inc.) and 9.95 g of SR531 (Sartomer, Inc.). The contents were mixed using a Flacktek DAC 150 FVZ—K speedmixer and were mixed at 3100 rpm for 1 min. The resulting solution was homogeneous near colorless viscous solution. To the speedmixer cup was added 0.5 g of Irgacure TPO-L catalyst. The contents were again mixed at 31000 rpm for 1 min. The resulting solution was then placed into a vacuum oven at 40 Celsius and was degassed to remove all dissolved air and bubbles from the viscous solution. The solution had a viscosity of ~6000 cP at room temperature. Film samples were made from this resin by coating the resin between a 2 mil thick ZF-50 and a 2 mil thick T50 silicone release coated polyester liner. The solution between films was drawn under a notch bar such a 175 μm film was cast. The coating between liners was irradiated under low power 350 nm black light bulbs for 15 minutes to give a cured film with elastic properties.

TABLE 1

Properties of crosslinked polyurethane core layer materials

| Example | Oligomer/ Diluent | Oligomer to Diluent Ratio | Tg (° C.) (Peak Tan δ) | Tan δ | Onset Tg (° C.) (from DMA Storage Modulus) | Storage Modulus (MPa) (23° C./ −20° C.) |
|---|---|---|---|---|---|---|
| 1 | CN9004/ CD9043 | 70/30 | −39 | 0.496 | −73 | 2.76/8.38 |
| 2 | CN9004/ SR501 | 80/20 | −65 | 0.442 | −75 | 1.02/9.67 |
| 3 | CN9004/ NA | 100/0 | −65 | 0.612 | −76 | 7.42/9.86 |
| 4 | CN3211/ NA | 100/0 | −20.7 | 1.473 | −30 | 2.87/27.4 |
| 5 | CN3211/ SR501 | 80/20 | −4 | 0.634 | −27 | 7.74/515.9 |
| 6 | CN3211/ CD9043 | 80/20 | −24 | 1.390 | −34 | 3.59/15.99 |

TABLE 1-continued

Properties of crosslinked polyurethane core layer materials

| Example | Oligomer/ Diluent | Oligomer to Diluent Ratio | Tg (° C.) (Peak Tan δ) | Tan δ | Onset Tg (° C.) (from DMA Storage Modulus) | Storage Modulus (MPa) (23° C./ −20° C.) |
|---|---|---|---|---|---|---|
| 7 | CN3211/ SR415 | 80/20 | −21 | 1.334 | −31 | 5.09/31.22 |
| 8 | CN3211/ SR531 | 70/30 | −5.5 | 1.334 | −23.5 | 1.80/711.9 |
| 9 | CN3211/ SR531 | 80/20 | −10.8 | 1.359 | −24.9 | 2.23/360.1 |
| 10 | CN3211/ SR531 | 90/10 | −16 | 1.399 | −28.5 | 2.39/97.4 |

Preparation of Cover Sheet Film 1: 5 micrometer CR73 HC on 1.5 mil LmPEN with PUA 1

A cover sheet film construction as shown in FIG. 2 was made by coating the resin from example 1 on the backside of HC (hardcoat) coated film 1, having a 5 micrometer hardcoat layer on 1.5 mil LmPEN with Vitel primer and a silicone release liner (Toray, Inc.). The solution was poured between the two films under a notch bar with a notch bar height set to give a cover sheet film thickness of 235 micrometers (HC/substrate/Core layer total thickness). The coating between films was irradiated under low power 350 nm black light bulbs (~15 mW/cm2) for 15 minutes to give a cured film.

Preparation of Cover Sheet Film 2: 5 micrometer CR73 HC on 2.0 mil LmPEN with PUA 1

A cover sheet film construction as shown in FIG. 1. was made by coating the resin from example 1 between the backside of HC coated film 1, having a 5 micrometer hardcoat layer on 2.0 mil LmPEN with vitel primer and a silicone release liner (Toray, Inc.). The solution was poured between the two films under a notch bar with a notch bar height set to give a cover sheet film thickness of 235 micrometers (HC/substrate/Core layer total thickness). The coating between films was irradiated under low power 350 nm black light bulbs (~15 mW/cm2) for 15 minutes to give a cured film. The sample passed 100,000 cycles of dynamic folding at a bend radius of 5 mm folding away from the HC at −20C with a folding rate of 20 cycles/min. Further test data for this sample is reported in Table 2 below.

Preparation of Cover Sheet Film 3: 5 Micrometer CR73 HC on 3.0 Mil LmPEN with PUA 1

A Cover Sheet film construction as shown in FIG. 1 is made by coating the resin from example 1 between the backside of HC coated film 1, having a 5 micrometer hardcoat layer on 3.0 mil LmPEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 4: 5 Micrometer CR73 HC on 1.5 Mil PEN with PUA 1

A cover sheet film construction as shown in FIG. 1 is made by coating the resin from example 1 between the backside of HC coated film 1, having a 5 micrometer hardcoat layer on 1.5 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 5: 5 Micrometer CR73 HC on 2.0 Mil PEN with PUA 1

A cover sheet film construction as shown in FIG. 1 is made by coating the resin from example 1 between the backside of HC coated film 1, having a 5 micrometer hardcoat layer on 2.0 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film. The sample will pass 100,000 cycles of dynamic folding at a bend radius of 5 mm folding away from the HC at −20C. The samples will pass 500 cycles of steel wool abrasion under a load of 1.5 Kg and a contact area for 3 cm.

Preparation of Cover Sheet Film 6: 5 Micrometer CR73 HC on 2.7 Mil PEN with PUA 1

A cover sheet film construction as shown in FIG. 1 is made by coating the resin from example 1 between the backside of HC coated film 1, having a 5 micrometer hardcoat layer on 3.0 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 7: 5 Micrometer CR73 HC on 1.5 Mil LmPEN with PUA 2

A cover sheet film construction as shown in FIG. 1 was made by coating the resin from example 2 between the backside of HC coated film 1, having a 5 micrometer hardcoat layer on 1.5 mil LmPEN with vitel primer and a silicone release liner (Toray, Inc.). The solution was poured between the two films under a notch bar with a notch bar height set to give a cover sheet film thickness of 235 micrometers (HC/substrate/Core layer total thickness). The coating between films was irradiated under low power 350 nm black light bulbs (~15 mW/cm2) for 15 minutes to give a cured film.

Preparation of Cover Sheet Film 8: 5 Micrometer CR73 HC on 2.0 Mil LmPEN with PUA 2

A cover sheet film construction as shown in FIG. 1. was made by coating the resin from example 2 between the backside of HC coated film 1, having a 5 micrometer hardcoat layer on 2.0 mil LmPEN with vitel primer and a silicone release liner (Toray, Inc.). The solution was poured between the two films under a notch bar with a notch bar height set to give a cover sheet film thickness of 235 micrometers (HC/substrate/Core layer total thickness). The coating between films was irradiated under low power 350 nm black light bulbs (~15 mW/cm2) for 15 minutes to give a cured film. The sample passed 100,000 cycles of dynamic folding at a bend radius of 5 mm folding away from the HC at −20C with a folding rate of 20 cycles/min. Further test data for this sample is reported in Table 2 below.

Preparation of Cover Sheet Film 9: 5 Micrometer CR73 HC on 3.0 Mil LmPEN with PUA 2

A cover sheet film construction as shown in FIG. 1 is made by coating the resin from example 2 between the backside of HC coated film 1, having a 5 micrometer hardcoat layer on 3.0 mil LmPEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 10: 5 Micrometer CR73 HC on 1.5 Mil PEN with PUA 2

A cover sheet film construction as shown in FIG. 1 is made by coating the resin from example 2 between the backside of HC coated film 1, having a 5 micrometer hardcoat layer on 1.5 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 11: 5 Micrometer CR73 HC on 2.0 Mil PEN with PUA 7

A cover sheet film construction as shown in FIG. 1 is made by coating the resin from example 7 between the backside of HC coated film 1, having a 5 micrometer hardcoat layer on 2.0 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 12: 5 Micrometer CR73 HC on 2.7 Mil PEN with PUA 7

A cover sheet film construction as shown in FIG. 1. is made by coating the resin from example 7 between the backside of HC coated film 1, having a 5 micrometer hardcoat layer on 3.0 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 13: 5 Micrometer CR73 HC on 1.5 Mil LmPEN with PUA 7

A cover sheet film construction as shown in FIG. 1. was made by coating the resin from example 7 between the backside of HC coated film 1, having a 5 micrometer hardcoat layer on 1.5 mil LmPEN with vitel primer and a silicone release liner (Toray, Inc.). The solution was poured between the two films under a notch bar with a notch bar height set to give a cover sheet film thickness of 235 micrometers (HC/substrate/Core layer total thickness). The coating between films was irradiated under low power 350 nm black light bulbs (~15 mW/cm2) for 15 minutes to give a cured film.

Preparation of Cover Sheet Film 14: 5 Micrometer CR73 HC on 2.0 Mil LmPEN with PUA 7

A cover sheet film construction as shown in FIG. 1. was made by coating the resin from example 7 between the backside of HC coated film 1, having a 5 micrometer hardcoat layer on 2.0 mil LmPEN with vitel primer and a silicone release liner (Toray, Inc.). The solution was poured between the two films under a notch bar with a notch bar height set to give a cover sheet film thickness of 235 micrometers (HC/substrate/Core layer total thickness). The coating between films was irradiated under low power 350 nm black light bulbs (~15 mW/cm2) for 15 minutes to give a cured film. Further test data for this sample is reported in Table 2 below.

Preparation of Cover Sheet Film 15: 5 Micrometer CR73 HC on 3.0 Mil LmPEN with PUA 7

A cover sheet film construction as shown in FIG. 1 is made by coating the resin from example 7 between the backside of HC coated film 1, having a 5 micrometer hardcoat layer on 3.0 mil LmPEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 16: 5 Micrometer CR73 HC on 1.5 Mil PEN with PUA 7

A cover sheet film construction as shown in FIG. 1 is made by coating the resin from example 7 between the backside of HC coated film 1, having a 5 micrometer hardcoat layer on 1.5 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 17: 5 Micrometer CR73 HC on 2.0 Mil PEN with PUA 2

A cover sheet film construction as shown in FIG. 1 is made by coating the resin from example 7 between the backside of HC coated film 1, having a 5 micrometer hardcoat layer on 2.0 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Preparation of Cover Sheet Film 18: 5 Micrometer CR73 HC on 2.7 Mil PEN with PUA 2

A cover sheet film construction as shown in FIG. 1 is made by coating the resin from example 7 between the backside of HC coated film 1, having a 5 micrometer hardcoat layer on 3.0 mil PEN with vitel primer and a silicone release liner (Toray, Inc.). The solution is poured between the two films under a notch bar with a notch bar height set to give a cover sheet film thickness of 235 micrometers (HC/substrate/Core layer total thickness). The coating between films is irradiated under low power 350 nm black light bulbs (~15 mW/cm2) for 15 minutes to give a cured film.

Polyurethane Acrylate Layer Characterization

Glass Transition Temperature

The glass transition temperature of the polyurethane acrylate coatings was characterized using a TA Instruments Model Q2000 Differential Scanning calorimeter. The scans were taken at 2° C. per minute heating rate. An empty sample pan was used as a reference. The results are shown in Table 1 above. The onset of the glass transition was determined per ASTM E1356-08 (2014).

Dynamic Mechanical Analysis Test Method

Samples were cut into strips 6.35 mm wide and about 4 cm long. The thickness of each film was measured. The films were mounted in the tensile grips of a Q800 DMA from TA Instruments with an initial grip separation between 6 mm and 9 mm. The samples were then tested at an oscillation of 0.2% strain and 1 Hz throughout a temperature ramp from −20° C. to 200° C. at a rate of 2° C. per minute. The temperature at which the Tan Delta signal reached a maximum was recorded as the peak Tan Delta temperature.

Transmission, Haze, and Clarity

Optical properties of the prepared examples were measured using a Hazegard instrument. Luminous transmission, clarity, and haze were measured according to ASTM D1003-00 using a Gardner Haze-Guard Plus model 4725 (available from BYK-Gardner Columbia, MD). Each result in Table 2 is the average of three measurements on a given sample.

Yellow Index or b*

Yellowness was assessed by measuring b* with a D65 light source. Measurements were taken in transmission on a Konica Minolta Spectrophotometer model CM3700d. Results shown in Table 2.

Mandrel Bend Test

Bending properties of the protective films were tested using a modified version of ASTM Method D522/522M-13 "Mandrel Bend Test of Attached Organic Coatings", test method B, Cylindrical Mandrel Test. Instead of bending to 90 degrees as specified in the ASTM method, all the samples were wrapped 180 degrees around the mandrel and then evaluated for damage. All samples were tested with the coating(s) on the outside radius (i.e. the coatings are in tension). The minimum cylinder size where no cracking was observed was reported as the minimum bend radius (pass/fail basis). The samples were pre-conditioned for at least 24 hrs at 21±2° C. and 50±5% relative humidity prior to the start of testing.

Low Temperature Dynamic Folding Test

The durability of the protective films to multiple folding events at low temperature was evaluated using a dynamic fold tester. The dynamic fold tester has two coplanar plates where one of the plates is fixed and the other plate rotates to be overlapping and facing each other. The gap between the plates when closed was set to approximately 10 mm, thereby making the bend radius approximately 5 mm. 7"×1.625" pieces of each sample were cut using a rotary cutter and the liner removed. Three replicates of each sample construction were attached to the folding plates coating side up (polyurethane-acrylate coating in compression) using 1.625" wide strips of a 50 micron thick silicone polyurea optically clear adhesive. The silicone polyurea optically clear adhesive was prepared as described in Example 4. The tape was applied to the plates such that there was a free zone approximately 15 mm wide on either side of the folding axis where the film was unconstrained. The entire folding apparatus was placed into an environmental chamber and then cooled to −20 degrees Celcius at 1 C/min. Once the chamber reached its set point, the folding rate was set to approximately 20 folds/min and the test run for at least 100,000 cycles. The samples were visually inspected through the window of the environmental chamber every 10,000-25,000 cycles for evidence of failure such as coating cracking, delamination or haze. Every 24 hrs, the fold tester was stopped, the chamber was warmed up to room temperature (~ 0.33 degrees Celcius/min) so that the samples could be inspected more closely for signs of failure. The chamber was then cooled down again as before and the test continued.

Abrasion Testing

Abrasion of the samples was tested cross web to the coating direction using a mechanical device capable of oscillating an abrasive material adhered to a stylus across each sample's coated surface. The stylus oscillated over a 60 mm wide sweep width at a rate of 210 mm/sec (2 wipes/second), where a wipe is defined as a single travel of 60 mm. The stylus was a cylinder with a flat base and a diameter of 3.2 cm. The abrasive material used for this test was steel wool that was obtained from Rhodes-American (a division of Homax Products, Bellingham, WA) under the trade designation "#0000-Super-Fine" and was used as received.

Disks of diameter 3.2 cm were cut from the pads and adhered to the base of the stylus using 3M Scotch Permanent Adhesive Transfer tape. A single sample was tested for each example with a 1.5 kg weight and 100 and 1000 wipes. After abrasion, samples were graded visually for scratch based on the visual standard shown below. Results shown in Table 2.

TABLE 2

| Sample | Transmission | Haze | Clarity | b* | Thickness (um) | Abrasion SW #0000 1.5 KG 100 Wipes | Abrasion SW #0000 1.5 KG 1000 Wipes |
|---|---|---|---|---|---|---|---|
| Cover Sheet Film 2 | 92.1 | 2.60 | 98.6 | 1.36 | 224 | NS | NS |
| Cover Sheet Film 8 | 92.4 | 1.86 | 98.6 | 0.76 | 218 | NS | NS |

TABLE 2-continued

| Sample | Trans-mission | Haze | Clarity | b* | Thickness (um) | Abrasion SW #0000 1.5 KG 100 Wipes | Abrasion SW #0000 1.5 KG 1000 Wipes |
|---|---|---|---|---|---|---|---|
| Cover Sheet Film 14 | 92.1 | 0.70 | 98.2 | 0.65 | 211 | NS | NS |

Thus, embodiments of POLYURETHANE ACRYLATE PROTECTIVE DISPLAY FILM are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A display film having a thickness in a range from 150 to 250 micrometers and comprising:
    a transparent polymeric substrate layer having a thickness in a range from 35 to 75 micrometers;
    a transparent cross-linked polyurethane acrylate layer having a thickness in a range from 150 to 200 micrometers and disposed on the transparent polymeric substrate layer, the transparent cross-linked polyurethane acrylate layer having a glass transition temperature of 10 degrees Celsius or less, a Tan Delta peak value of 0.5 or greater, and a storage modulus at 23 degrees Celsius in a range of 1.02 MPa to 7.74 MPa; and
    a hardcoat layer having a thickness in a range from 3 to 10 micrometers and disposed on the transparent polymeric substrate layer;
    wherein the transparent polymeric substrate layer separates the transparent cross-linked polyurethane acrylate layer from the hardcoat layer, and
    wherein the display film passes 100,000 cycles of dynamic folding at a bend radius of 5 mm folding away from the hardcoat layer at 0° C. with a folding rate of 20 cycles/min.

2. The display film according to claim 1, wherein the transparent cross-linked polyurethane acrylate layer has a glass transition temperature of zero degrees Celsius or less.

3. The display film according to claim 1, wherein the transparent cross-linked polyurethane acrylate layer has a Tan Delta peak value of 0.8 or greater.

4. The display film according to claim 1, wherein the display film has a haze of 1.0 or less and a visible light transmission of 85% or greater.

5. The display film according to claim 1, wherein the transparent polymeric substrate layer has a yield stress value greater than 70 MPa.

6. The display film according to claim 1, wherein the transparent cross-linked polyurethane acrylate layer comprises a plurality of layers, each layer formed of a cross-linked polyurethane acrylate material and at least two layers having a different glass transition temperature value.

7. The display film according to claim 1, wherein a premask layer defines an outer surface of the display film.

8. The display film of claim 1, wherein the display film passes 100,000 cycles of dynamic folding at a bend radius of 5 mm folding away from the hardcoat layer at −20° C. with a folding rate of 20 cycles/min.

9. The display film according to claim 1, wherein the transparent cross-linked polyurethane acrylate layer has a glass transition temperature of −31 degrees Celsius or less.

10. The display film according to claim 1, wherein the hardcoat layer comprises inorganic oxide nanoparticles having a refractive index of 1.65 or higher and an average primary particle size or associated particle size of at least 10 nm and no greater than 200 nm, and the total concentration of the inorganic oxide nanoparticles is at least 30 wt % solids and no greater than 90 wt % solids.

11. The display film according to claim 1, further comprising an adhesive layer disposed on the transparent cross-linked polyurethane acrylate layer, and the transparent cross-linked polyurethane acrylate layer separates the transparent polymeric substrate layer from the adhesive layer.

12. The display film according to claim 11, further comprising a release or removable liner disposed on the adhesive layer.

13. The display film according to claim 1, further comprising a second transparent polymeric substrate layer disposed on the transparent cross-linked polyurethane acrylate layer, and the transparent cross-linked polyurethane acrylate layer separates the transparent polymeric substrate layer from the second transparent polymeric substrate layer.

14. The display film according to claim 13, further comprising an adhesive layer disposed on the second transparent polymeric substrate layer, and the second transparent polymeric substrate layer separates the transparent cross-linked polyurethane acrylate layer from the adhesive layer.

15. The display film according to claim 14, further comprising a release or removable liner disposed on the adhesive layer.

16. The display film according to claim 14, wherein the hardcoat layer comprises nanoparticles and has a thickness in a range from 2 to 30 micrometers.

17. An article, comprising:
    an optical display;
    a display film according to claim 1; and
    an optical adhesive layer fixing the display film to the optical display.

* * * * *